US012099223B2

(12) United States Patent
Frey et al.

(10) Patent No.: US 12,099,223 B2
(45) Date of Patent: Sep. 24, 2024

(54) OPTICAL CONSTRUCTIONS

(71) Applicant: 3M INNOVATIVE PROPERTIES COMPANY, St. Paul, MN (US)

(72) Inventors: Matthew H. Frey, Cottage Grove, MN (US); Craig R. Schardt, Woodbury, MN (US); Gary T. Boyd, Woodbury, MN (US); Eric J. Borchers, Lakeland, MN (US); Nicole D. Petkovich, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 698 days.

(21) Appl. No.: 16/419,339

(22) Filed: May 22, 2019

(65) Prior Publication Data
US 2019/0278009 A1 Sep. 12, 2019

Related U.S. Application Data

(63) Continuation of application No. 15/568,016, filed as application No. PCT/US2016/032677 on May 16, 2016, now Pat. No. 10,317,594.
(Continued)

(51) Int. Cl.
| | |
|---|---|
| *G02B 5/30* | (2006.01) |
| *B82Y 15/00* | (2011.01) |
| *C01B 32/158* | (2017.01) |
| *F21V 8/00* | (2006.01) |
| *G02B 5/02* | (2006.01) |
| *G02F 1/1335* | (2006.01) |
| *G02F 1/13357* | (2006.01) |
| *G02B 5/124* | (2006.01) |

(52) U.S. Cl.
CPC ............ *G02B 5/30* (2013.01); *B82Y 15/00* (2013.01); *C01B 32/158* (2017.08); *G02B 5/02* (2013.01); *G02B 6/0056* (2013.01); *G02F 1/133536* (2013.01); *G02F 1/13362* (2013.01); *G02B 5/124* (2013.01); *G02B 2207/101* (2013.01); *G02B 2207/107* (2013.01); *G02F 1/133606* (2013.01); *G02F 2203/02* (2013.01)

(58) Field of Classification Search
None
See application file for complete search history.

(56) References Cited

U.S. PATENT DOCUMENTS

| | | | | |
|---|---|---|---|---|
| 6,088,067 | A * | 7/2000 | Willett | G02F 1/13362 349/5 |
| 6,124,971 | A * | 9/2000 | Ouderkirk | G02F 1/13362 349/114 |

(Continued)

FOREIGN PATENT DOCUMENTS

WO WO 2008/027031 3/2008

OTHER PUBLICATIONS

International Search report for PCT International Application PCT/US2016/032677 mailed on Aug. 24, 2016, 5 pages.

*Primary Examiner* — Robert E. Tallman
(74) *Attorney, Agent, or Firm* — Robert S. Moshrefzadeh (57) ABSTRACT

An optical construction includes a reflective polarizer layer having a first pass axis and an absorptive polarizer layer having a second pass axis that is substantially aligned with the first pass axis. At least one electrically conductive light scattering layer is arranged between the reflective polarizer layer and the absorptive polarizer layer.

19 Claims, 5 Drawing Sheets

Related U.S. Application Data (60) Provisional application No. 62/168,205, filed on May 29, 2015.

(56) References Cited

U.S. PATENT DOCUMENTS

| | | | |
|---|---|---|---|
| 6,538,714 B1* | 3/2003 | Sahouani | G02B 5/3033 |
| | | | 349/194 |
| 6,921,575 B2 | 7/2005 | Horiuchi et al. | |
| 7,864,270 B2* | 1/2011 | Zhuang | G02F 1/13306 |
| | | | 349/97 |
| 8,384,691 B2* | 2/2013 | Frey | G06F 3/045 |
| | | | 345/174 |
| 9,207,796 B2* | 12/2015 | Park | G06F 3/045 |
| 9,244,286 B2* | 1/2016 | Evans | G02B 30/25 |
| 2002/0089622 A1 | 7/2002 | Kuroiwa et al. | |
| 2003/0164914 A1* | 9/2003 | Weber | G02F 1/133606 |
| | | | 349/115 |
| 2004/0164292 A1* | 8/2004 | Tung | G02F 1/133603 |
| | | | 257/40 |
| 2006/0257638 A1 | 11/2006 | Glatkowski et al. | |
| 2008/0143906 A1 | 6/2008 | Allemand et al. | |
| 2009/0133922 A1* | 5/2009 | Okazaki | H05K 9/0096 |
| | | | 428/209 |
| 2010/0117988 A1* | 5/2010 | Jacobs | G06F 3/045 |
| | | | 345/175 |
| 2013/0002994 A1* | 1/2013 | Wang | G02F 1/133528 |
| | | | 349/96 |
| 2015/0022888 A1 | 1/2015 | Weber et al. | |
| 2017/0261808 A1 | 9/2017 | Sakai et al. | |

* cited by examiner

OPTICAL CONSTRUCTIONS

TECHNICAL FIELD

This disclosure relates generally to multilayered optical constructions comprising polarizer and light scattering layers and to associated devices and systems.

BACKGROUND

The vast majority of computers are accessed through user interfaces that include an optical display, such as a liquid crystal display (LCD). Optical displays are becoming increasingly prevalent as the use of processor-based mobile devices expands through the population. LCDs typically include one or more light management films to enhance display performance parameters, e.g., output luminance, illumination uniformity, viewing angle, and overall efficiency. These light management films are generally stacked between a backlight assembly and an LCD panel and can include prismatically structured layers, reflective polarizer layers, absorptive polarizer layers and/or diffuser layers. In some applications, optical displays used with computers and mobile devices also incorporate layers that provide for touch sensing or electromagnetic interference (EMI) shielding.

BRIEF SUMMARY

Some embodiments involve an optical construction that includes a reflective polarizer layer having a first pass axis and an absorptive polarizer layer having a second pass axis that is substantially aligned with the first pass axis. At least one electrically conductive light scattering layer is arranged between the reflective polarizer layer and the absorptive polarizer layer.

Some embodiments are directed to an optical construction that includes a partially reflective layer arranged to receive input light and an absorptive polarizer layer. At least one electrically conductive light scattering layer is arranged between the partially reflective layer and the absorptive polarizer layer.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Some embodiments described herein relate to optical constructions comprising two polarizer layers and at least one light scattering and light depolarizing layer arranged between the polarizer layers. For example, some embodiments described below include a reflective polarizer layer and an absorptive polarizer layer with an optically transparent, electrically conductive layer, such as a nanowire-based transparent conductor layer, disposed between the reflective polarizer layer and the absorptive polarizer layer. The optical constructions exemplified by the various embodiments have been found to exhibit lower transmitted haze than other optical arrangements that include a reflective polarizer, an absorptive polarizer and a light scattering layer.

Metal nanowire layers and/or other electrically conductive layers can exhibit light scattering, leading to increased transmitted haze for transparent constructions having the nanowire layer integrated therein. Transmitted haze, for elements of an optical construction such as a liquid crystal display and depending on the detailed design of the display, can reduce the performance of the display (e.g., reduce the visual quality of a liquid crystal display by reducing contrast ratio). Accordingly, the constructions exemplified by various embodiments discussed in this disclosure allow for incorporation of one or more optically transparent and electrically conductive layers, such as metal nanowire-based transparent conductor layers, into an optical construction, whilst reducing the negative impact of light scattering by the nanowires or other conductive elements.

One or more optically transparent, electrically conductive layers, when combined with polarizer layers, may serve one or more functions in an optical construction or device (e.g., a liquid crystal display). These function include but are not limited to electromagnetic interference shielding, static dissipation, sensing (e.g., touch sensing and/or force sensing), and application of electric field for liquid crystal switching, for example.

Exemplary optical constructions disclosed herein can be useful for polarizing film stacks, monolithic polarizer plates, switchable privacy filters, electrochromic windows, liquid crystal display modules, and liquid crystal displays.

Figure 1:
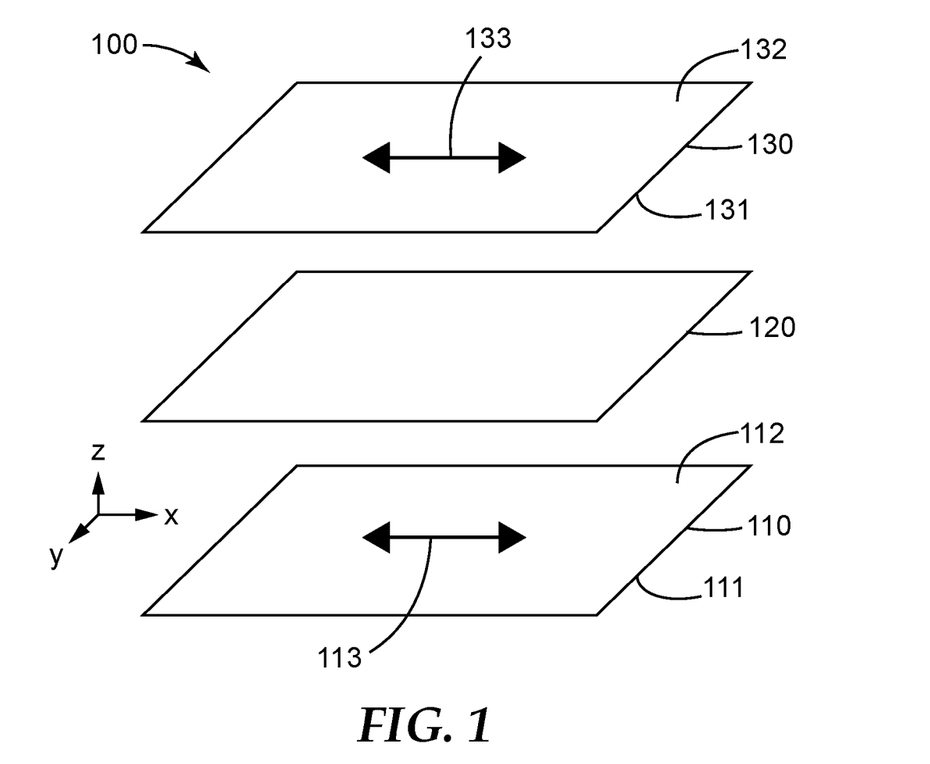
FIG. 1 is an exploded perspective view of an optical construction in accordance with some embodiments.

FIG. 1 shows an exploded perspective view of optical construction 100 in accordance with some embodiments. The optical construction 100 includes a reflective polarizer layer 110 having a first major surface 111, an opposing second major surface 112, and a first pass axis 113. The optical construction 100 is arranged so that the first major surface 111 of the reflective polarizer layer 110 receives input light.

The optical construction 100 further includes an absorptive polarizer layer 130 having a first major surface 131, an opposing second major surface 132, and a second pass axis 133 that is substantially aligned with the first pass axis of the reflective polarizer layer 110, wherein substantially aligned refers to parallel alignment of the axes within about 15 degrees, in some embodiments within about 10 degrees, and in other embodiments within about 5 degrees.

At least one optically transparent, electrically conductive, light scattering and light depolarizing layer 120 is arranged between the reflective polarizer layer 110 and the absorptive polarizer layer 130. The reflective polarizer layer 110, light scattering layer 120, and absorptive polarizer layer 130 are arranged to be substantially parallel and overlapping. At least some of the input light incident at the first surface 111 of the reflective polarizer layer 110 passes through the reflective polarizer layer 110, the light scattering layer 120, and the absorptive polarizer layer 130 and exits from the second surface 132 of the absorptive polarizer layer 130.

According to some embodiments, the light scattering layer 120 may be arranged directly adjacent to the second surface 112 of the reflective polarizer layer 110 without any intervening layers. In alternative embodiments, there may be at least one additional layer, e.g., an adhesive layer, between the light scattering layer 120 and the second surface 112 of the reflective polarizer layer 110. According to some embodiments, the light scattering layer 120 may be arranged directly adjacent to the first surface 131 of the absorptive polarizer layer 130 without any intervening layers. In alternative embodiments, there may be at least one additional layer, e.g., an adhesive layer in between the light scattering layer 120 and the first surface 131 of the absorptive polarizer layer 130. According to some embodiments, the light scattering layer 120 may be arranged on a supporting substrate that is separate from the reflective polarizer layer 110 and the absorptive polarizer 130, for example a separate polymer film such as polyethylene terephthalate (PET), polyethylene napthalate, (PEN), polycarbonate (PC), poly(methyl methacrylate) (PMMA), cyclic olefin polymer (COP), cyclic olefin copolymer (COC), cellulose triacetate (TAC), or co-polymers or blends thereof.

The optical constructions as disclosed herein have been found to exhibit lower transmitted haze than other optical constructions that include a reflective polarizer, absorptive polarizer and light scattering layer such as a nanowire-based layer. The transmitted haze of optical construction 100 may be between about 0.1 and 10 percent, between about 0.2 and 5, between about 0.3 and 3, between about 0.4 and 2, between about 0.5 and 1.5, or no greater than about 1.0 percent for example. The optical construction 100 has a transmitted haze that is less than the transmitted haze of a combination of the light scattering layer and reflective polarizer layer without the absorptive polarizer layer. For example, the transmitted haze of the optical construction 100 may be less than the transmitted haze of the combination of the light scattering layer and the reflective polarizer layer without the absorptive polarizer layer by at least about 10%, about 20%, about 30%, about 40%, or even about 50%.

The reflective polarizer layer 110 may be at least part of a polymeric multilayer optical film (MOF). In some configurations, the reflective polarizer layer may be replaced with any partial reflector, for example a partial reflector having visible light reflectance between 25% and 75%. The absorptive polarizer layer 130 may be at least part of a polymeric polarizer film.

The light scattering layer 120 comprises an optically transparent, electrically conductive layer that scatters and depolarizes light. In some embodiments, the light scattering layer 120 may be a substantially continuous, non-voided layer. Alternatively, the light scattering layer 120 may include voids. The light scattering layer can be disposed on a supporting substrate, such a polymer film. Alternatively, in some embodiments the light scattering layer may not include a separate supporting substrate and may instead be coated directly on at least one adjacent layer, e.g., at least one of the reflective polarizer layer and the absorptive polarizer layer.

The thickness of the light scattering layer 120 (along the z direction in FIG. 1) can be any thickness required or suitable for application, preferably between about 1 nanometer and 1 micrometer. For example, in various embodiments, the thickness of the light scattering layer 120 may be between about 5 and 500 nanometers, or between about 10 and 250 nanometers. The light scattering layer 120 may have transmitted haze between about 0.1 and 10 percent, between about 0.2 and 5, between about 0.3 and 3, between about 0.4 and 2, between about 0.5 and 1.5, or no greater than about 1.0 percent. The refractive index of the light scattering layer 120 may be greater than about 1.40 and less than about 2.20, e.g., between about 1.45 and 2.10 or between about 1.50 and 1.80. The light scattering layer incorporates suitable electrically conductive materials that provide a sheet resistance of the light scattering layer 120 between about 0.01 and $10^9$ ohms per square. For example, in various implementations, the light scattering layer 120 may have a sheet resistance between about 0.1-1000, about 1-100, about 5-75, or about 10-60 ohms per square.

In some embodiments, the light scattering layer includes electrically conductive nanowires such as nanowires of metal, metal alloys, and/or conductive metal oxide. In some embodiments, the nanowires may have an average diameter of about 1 to 100 nanometers and may be about 1 to 50 micrometers in average length. In some embodiments, the nanowires may have an average diameter of about 5 to 20 nanometers and may be about 5 to 10 micrometers in average length. The nanowires may be embedded in a non-porous, non-voided polymer matrix. In various implementations, the aspect ratio of the nanowires can be greater than about 5, greater than about 10, greater than about 100, or even greater than about 1000, for example. In some configurations, the nanowires may have randomized orientations in the plane of the light scattering layer. In some configuration, the nanowires may be arranged in a regular pattern such as a two dimensional grid (e.g., square grid).

In some embodiments, the light scattering layer 120 may additionally or alternatively comprise carbon nanotubes, e.g. as described in commonly owned U.S. Pat. No. 8,384,691 which is incorporated herein by reference. The light scattering layer 120 may comprise electrically conductive wires, e.g., metal wires, arranged to form an electrically conductive mesh.

In some embodiments, the light scattering layer 120 may additionally or alternatively comprise a patterned thin film metal (e.g., silver, aluminum, gold, palladium) mesh or grid (e.g., square grid, hexagonal mesh, or randomized mesh). The patterned thin film metal mesh may comprise traces having a width of, for example, between 0.05 and 10 micrometers, between 0.1 and 5 micrometers, or between 0.2 and 1 micrometer. The patterned thin film metal mesh may have a thickness of, for example, between 0.05 and 10 micrometers, between, 0.1 and 5 micrometers, or between 0.2 and 1 micrometer.

The conductive elements, e.g., nanowires, carbon nanotubes, etc., of the light scattering layer may be supported on a separate substrate, such as a polymer film. The conductive elements may be coated onto either or both of the reflective polarizer layer and the absorptive polarizer layer.

In some embodiments, the conductive elements, e.g., nanowires, carbon nanotubes, etc., of the light scattering layer may form a conductive layer covering the majority of the light scattering layer 120. In some embodiments, the conductive elements may be patterned to form conductive regions, for example conductive lines, wires, traces, or pads, to form one or more conductive elements within the scattering layer 120.

Any or all of the aforementioned layers may be optically bonded using, for example, an optically clear adhesive. Optionally, some or all three of the reflective polarizer layer, the absorptive polarizer layer, and the light scattering layer may be integrated into a unitary body.

In various embodiments, the optical construction optionally further comprises a light source arranged to emit light toward the first major surface of the reflective polarizer. The light source may be at least part of a backlight assembly for a display.

The optical construction optionally further comprises a display panel, for example a liquid crystal display panel that may be positioned toward the second major surface of the absorptive polarizer.

Figure 2:
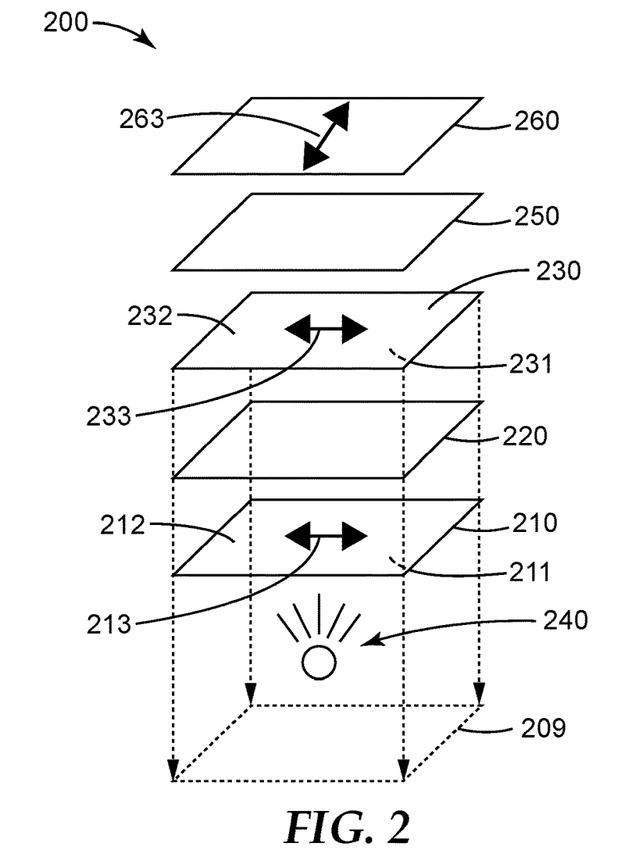
FIG. 2 is an exploded perspective view of an optical construction that includes a light source and display module according to some embodiments.

FIG. 2 provides an exploded perspective view of an optical construction 200 in accordance with some embodiments. The optical construction 200 includes a reflective polarizer layer 210 and an absorptive polarizer layer 230 with a light scattering layer 220 disposed therebetween. The reflective polarizer layer 210 has a first major surface 211, an opposing second major surface 212, and a first pass axis 213. The absorptive polarizer layer 230 has a first major surface 231, a second major surface 232, and a second pass axis 233 that is substantially aligned with the first pass axis 213. The absorptive polarizer layer 230 overlaps the reflective polarizer layer 210 defining a projected region of overlap 209 in a plane normal to the layers 210, 220, 230. The first major surface 231 of the absorptive polarizer layer 230 is oriented toward the second major surface 212 of the reflective polarizer layer 101.

The optically transparent, electrically conductive light scattering layer 220, e.g., a metal nanowire-based transparent conductor layer, is arranged substantially parallel to the reflective polarizer layer 210 and the absorptive polarizer layer 230 and is interposed between the second major surface 212 of the reflective polarizer layer 210 and the first major surface 231 of the absorptive polarizer layer 230. The light scattering layer 220 overlaps with the projected region of overlap 209 of the reflective polarizer layer 210 and the absorptive polarizer layer 230.

The optical construction 200 further comprises a light source 240 that generates input light directed toward the first major surface 211 of the reflective polarizer layer 210. For example, in some implementations, the light source 240 may be at least part of a backlight assembly for a display. The optical construction 200 may also include a display panel 250, e.g., comprising an array of one or more LCD elements, positioned proximate to the second major surface 232 of the absorptive polarizer layer 230. The optical construction 200 may further comprise an additional polarizer 260, e.g., an absorptive polarizer having third pass axis 263 that is at an angle, e.g., substantially orthogonal, with respect to the first pass axis 213 and second pass axis 233.

Figure 3:
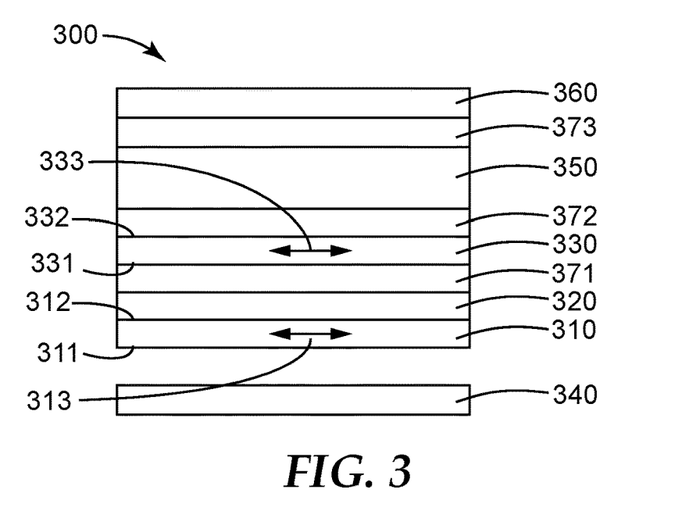
FIGS. 3 and 4 are side views of optical constructions that include adhesive layers according to various embodiments.

FIG. 3 is a side view of an optical construction 300 in accordance with some embodiments. Optical construction 300 includes a reflective polarizer layer 310 having a first major surface 311, a second major surface 312, and a first pass axis 313. Optical construction 300 also includes an absorptive polarizer layer 330 having a first major surface 331, a second major surface 332, and a second pass axis 333 that is substantially aligned with the first pass axis 313. An optically transparent, electrically conductive light scattering layer 320, e.g., a metal nanowire-based transparent electrical conductor, is coated on the second major surface 312 of the reflective polarizer layer 310.

As shown in FIG. 3, optical construction 300 can include a light source 340 positioned so that the light source 340 emits input light directed toward the first major surface 311 of the reflective polarizer layer 310. The light source 340 may be a component of a backlight assembly for a display, for example. A display panel 350 can be positioned proximate to the second major surface 332 of the absorptive polarizer layer 330. As depicted in FIG. 3, in some embodiments the optical construction 300 can include one or more additional layers 360 proximate to the display panel 350, e.g., an additional absorptive polarizer disposed along a surface of the display panel opposite the absorptive polarizer layer 330.

Optically clear adhesive layers may be disposed between pairs of adjacent layers of the optical construction. The optical construction 300 includes optically clear adhesive layers 371, 372, and 373. Adhesive layer 371 is disposed between the light scattering layer 320 and the first major surface 331 of the absorptive polarizer layer 330 and serves to bond the light scattering layer 310 to the absorptive polarizer layer 330. Adhesive layer 372 is disposed between the second major surface 332 of the absorptive polarizer layer 330 and the display module 350 and serves to bond the absorptive polarizer layer 330 to the display module 350. Adhesive layer 373 is disposed between the display module 350 and the additional polarizer layer 360 and serves to bond the display module 350 to the additional polarizer layer 360.

Figure 4:
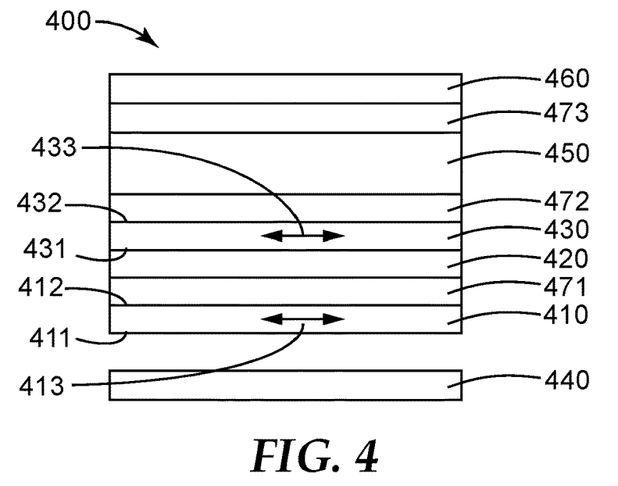

FIG. 4 is a side view of an optical construction 400 in accordance with some embodiments. Optical construction 400 includes a reflective polarizer layer 410 having a first major surface 411, a second major surface 412, and a first pass axis 413. Optical construction 400 further includes absorptive polarizer layer 430 having a first major surface 431, a second major surface 432, and a second pass axis 433 that is substantially aligned with the first pass axis 413. An optically transparent, electrically conductive light scattering layer 420, e.g., a metal nanowire-based transparent electrical conductor, is coated on the first major surface 431 of the absorptive polarizer layer 430.

As shown in FIG. 4, optical construction 400 can include a light source 440 positioned so that it emits input light directed toward the first major surface 411 of the reflective polarizer layer 410. The light source 440 may be a component of a backlight assembly for a display, for example. The optical construction 400 further comprises a display panel 450 such as an array of liquid crystal display elements, positioned proximate to the second major surface 432 of the absorptive polarizer layer 430. As depicted in FIG. 4, in some embodiments the optical construction includes an additional layer 460 which may comprise an additional absorptive polarizer layer.

Optically clear adhesive layers may be disposed between pairs of adjacent layers of the optical construction 400.

Adhesive layer 471 is disposed between the light scattering layer 420 and the second major surface 412 of the reflective polarizer layer 410 and serves to bond the light scattering layer 420 to the reflective polarizer layer 410. Adhesive layer 472 is disposed between the second major surface 432 of the absorptive polarizer layer 430 and the display panel 450 and serves to bond the absorptive polarizer layer 430 to the display panel 450. Adhesive layer 473 is disposed between the display panel 450 and the additional polarizer layer 460 and serves to bond the display panel 450 to the additional polarizer layer 460.

An optically transparent, electrically conductive layer such as a nano-wire-based layer, when combined with polarizer layers as described herein may serve one or more functions in an optical construction or device such as a liquid crystal display (LCD), including but not limited to electromagnetic interference shielding, static dissipation, sensing, e.g., resistive or capacitive-based touch and/or force sensing, and the application of an electric field for switching the orientation of crystals in a liquid crystal display.

Figure 5:
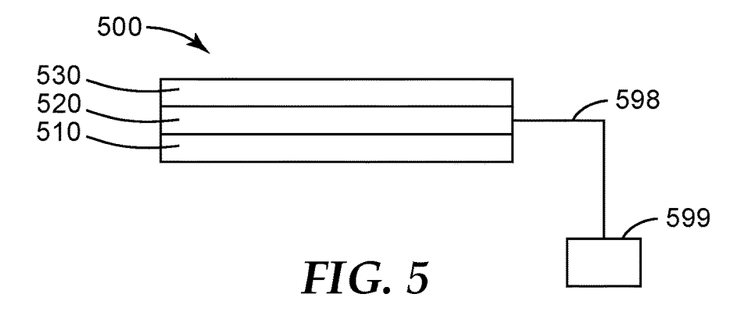
FIG. 5 is a block diagram that illustrates an optical construction with a light scattering layer coupled through one or more electrical connections to allow operation of the optical construction in conjunction with electrical circuitry in accordance with some embodiments.

FIG. 5 is a block diagram that illustrates an optical construction 500 with a light scattering layer 520 disposed between a reflective polarizer layer 510 and an absorptive polarizer layer 530, according to any of the foregoing embodiments. The light scattering layer 520 is coupled through one or more electrical connections 598 to allow operation of the optical construction 500 in conjunction with electrical circuitry 599. According to one example embodiment, the one or more electrical connections 598 are configured to electrically couple the light scattering layer 520 for operation as one or both of a touch sensor and a force sensor. In this example, the electrical circuitry 599 may comprise touch and/or force sensor controller circuitry.

Some capacitive and/or resistive touch and/or force sensors (referred to herein as touch/force sensors) can include first and second conductive layers of electrically conductive wires wherein the conductive wires in the first layer run at an angle, e.g., orthogonal, to the wires in the second layer and overlap the wires in the second layer at sensing nodes. In these implementations, the first and the second conductive layers may be disposed between the reflective polarizer and the absorptive polarizer. The electrically conductive wires of the conductive layers are electrically coupled to a touch/force sensor controller.

According to another embodiment the one or more electrical connections 598 are configured to electrically couple the light scattering layer 520 as a control contact layer for display element switching. In this example, the electrical circuitry 599 may comprise display controller circuitry. For example, the optically transparent and electrically conductive light scattering layer 520 may comprise an array of individually addressable contact pads configured to be electrically coupled to an array of LCD elements. Selective application of a voltage at the conductive contact pads of the light scattering layer 520 by the display controller 599 controls the operation of the LCD elements.

According to yet another embodiment, the one or more electrical connections 598 are configured to electrically couple the light scattering layer 520 as an electrostatic discharge dissipation layer. In this example, the one or more electrical connections 598 may provide a low impedance path between the light scattering layer to ground. For example, the light scattering layer 520 may be electrically coupled so that substantially conductive elements of the light scattering layer 520 are at ground potential providing static dissipation. In this example, the electrical circuitry 599 comprises a connection to ground, e.g., earth ground.

According to yet another embodiment, the one or more electrical connections 598 are configured to electrically couple the light scattering layer 520 as an electromagnetic interference shield. In this example, the one or more electrical connections may provide a low impedance path to ground. For example, the light scattering layer 520 may be electrically coupled so that substantially all of the conductive elements of the light scattering layer 530 are at ground potential providing a shield for electromagnetic interference. In this example, the electrical circuitry 599 comprises a connection to ground, e.g., circuit ground, chassis ground, and/or earth ground.

Figure 6A:
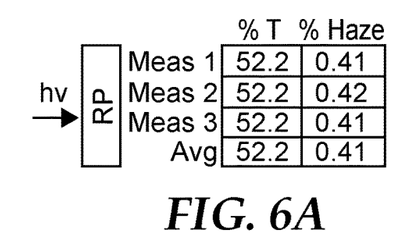
FIGS. 6A through 6D report results of light transmission and haze measurements for optical constructions, light transmission and haze measurement results for each of the constituent layers of the optical constructions, the difference in haze between optical constructions and the sum of haze for the constituent films of the optical constructions.
Figure 6B:
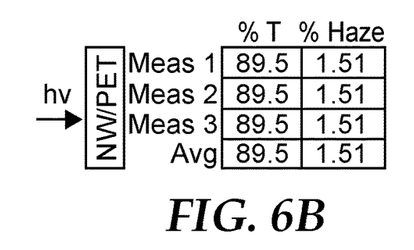
Figure 6C:
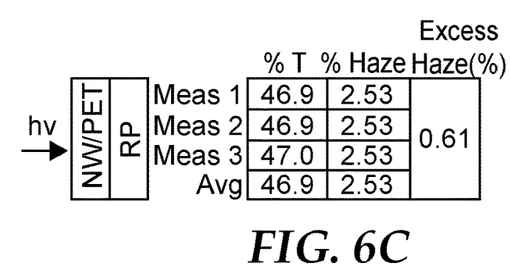
Figure 6D:
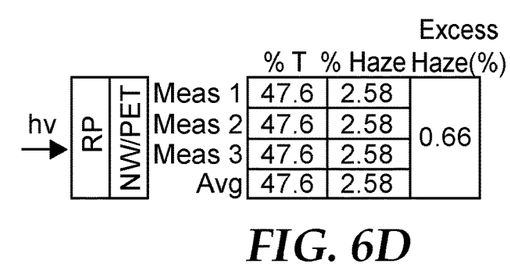

The examples provided above with reference to FIG. 5, illustrate some ways that optically transparent, electrically conductive materials used in conjunction with polarizers provide useful functionality. Transmitted haze (per ASTM D1003-11) for the materials of construction of transparent or light-emissive devices (e.g., displays) can sometimes diminish device performance or quality, for example the contrast ratio of a display. The inventors unexpectedly recognized that the combination of a nanowire layer with a reflective polarizer layer yields a construction that exhibits substantially higher measured haze than the sum of haze contributions from the nanowire layer and reflective polarizer layer constituent components. The term "excess haze" is used herein to describe the amount of haze by which the measured haze percentage value of a multiple layer construction exceeds the sum of haze percentage values for the individual constituent layers (expressed as the haze percentage difference). To illustrate the encountered problem, FIGS. 6A through 6D report results of light transmission and haze measurements for optical constructions including a silver nanowire-based transparent conductor layer coated onto a PET film (denoted NW/PET) and a reflective polarizer film (denoted RP). FIGS. 6A through 6 D also report light transmission and haze measurement results for each of the constituent layers. Finally, FIGS. 6A through 6D report the difference in haze between optical constructions and the sum of haze for the constituent films of the optical constructions ("excess haze"). It will be appreciated that these measurements confirm that the haze of the optical constructions exceeds the haze of the constituent components of the optical constructions resulting in excess haze.

Embodiments disclosed herein provide a solution that reduces the transmitted haze of polarizing constructions that comprise a light scattering layer, such as a metal nanowire-based transparent conductor layer or other light-scattering medium that is reflective and depolarizing. The solution leverages a new understanding reported herein of the origin of the unexpected excess haze illustrated in FIG. 6A through 6D. The origin of the formerly unknown excess transmitted haze behavior has become understood to derive at least in part from an interaction between the partial reflectivity of the polarizer and the unpolarized backward scattering (or diffuse reflection) of the metal nanowire-based transparent conductor layer.

Figure 7:
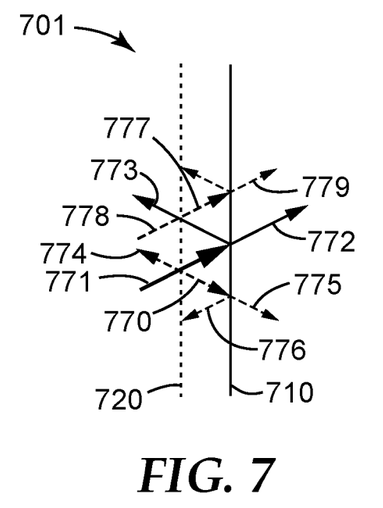
FIGS. 7 and 8 illustrate a mechanism of excess haze formation for the combination of a metal nanowire based transparent conductor layer and a reflective polarizer.
Figure 8:
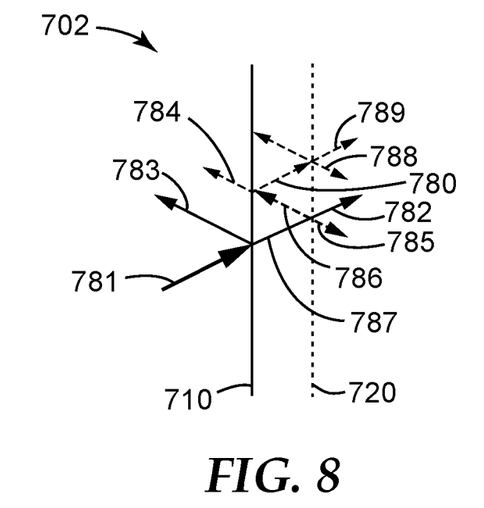

FIGS. 7 and 8 illustrate a mechanism of excess haze formation for each of two possible arrangements of the nanowire layer relative to the reflective polarizer layer and the incident light. FIGS. 7 and 8 illustrate the mechanism of excess haze formation (denoted haze amplification) for the combination of a metal nanowire based transparent conductor layer and a reflective polarizer. In the conceptual schematics shown in FIGS. 7 and 8, scattered light is indicated by dashed lines, with relative intensities indicated by the weights of the lines. FIG. 7 depicts operation wherein the input light is incident on the nanowire layer. FIG. 8 depicts operation wherein the input light is incident on the reflective polarizer layer. Note that not all scattered light is rendered in FIGS. 7 and 8, rather components that are more important for describing the operation and/or larger components are rendered. The net quantities of scattered light (transmitted scattered light and reflected scattered light) are given by an infinite series of components having sharply decreasing intensity.

FIG. 7 depicts an optical construction 701 having a nanowire layer 720 adjacent to a reflective polarizer layer 710 wherein input light (represented by arrow 771) is incident on the nanowire layer 720. Light that emerges from the optical construction 701 has three components labeled in FIG. 7 as specular transmission (arrow 772), primary nanowire (NW) haze (arrow 775), and excess haze (arrow 779). In the descriptions of the light paths that follow, the reflective polarizer is treated as an ideal reflective polarizer (i.e. all light polarized along the pass axis will transmit and all light polarized orthogonal to the pass axis will reflect). In real reflective polarizers, other effects including Fresnel reflections and incident angle dependence will cause some deviation from the ideal behavior, however this deviation is generally small and does not substantially change the interaction described.

A portion of the input light is not scattered by the nanowire layer 720 and passes through the nanowire layer 720 to the reflective polarizer 710. Unscattered light that passes through the nanowire layer 720 and that also has a polarization that aligns with the pass axis of the reflective polarizer 710 passes through the reflective polarizer 710 providing the specular transmission component 772.

Some input light is scattered by the nanowire layer 720 resulting in back scattered light 774 and forward scattered light 770. Forward scattered light 770 having a polarization that aligns with the pass axis of the reflective polarizer 710 passes through the reflective polarizer 720. The forward scattered, polarized light provides the primary nanowire haze 775.

Light that is not scattered by the nanowire layer 720 and that has a polarization that does not align with the pass axis of the reflective polarizer 710 is reflected by the reflective polarizer 710 toward the nanowire layer 720 (arrow 773). When this reflected light (arrow 773) interacts with the nanowire layer 720, some light is forward scattered 778 (forward, relative to the direction of light 773) and some light is back scattered 787 (backward relative to the direction of light 773) by the nanowire layer 720. Light 787 that is back scattered by the nanowire layer 720 and that also has a polarization aligned with the pass axis of the reflective polarizer 710 passes through the reflective polarizer. This polarizer-reflected, then nanowire-back-scattered, and then polarized light 779 provides at least some of the excess haze of the optical construction 701.

FIG. 8 depicts an optical construction 702 having a nanowire layer 720 adjacent to a reflective polarizer 710 wherein input light 781 is incident on the reflective polarizer 710. The light that emerges from the optical construction 702 has three components labeled in FIG. 8 as specular transmission 782, primary nanowire (NW) haze 785, and excess haze 788, 789.

Some input light 781 has a polarization aligned with the pass axis of the reflective polarizer 710 and passes through the reflective polarizer (arrow 787) to the nanowire layer 720. Light that is not scattered by the nanowire layer 720 provides specular transmission 782. Light that passes through the reflective polarizer 710 that is forward scattered by the nanowire layer 720 provides the primary NW haze 785. Light that does not have a polarization aligned with the pass axis of the reflective polarizer 710 is reflected by the reflective polarizer (arrow 783).

Some light that passes through the reflective polarizer 720 is back scattered by the nanowire layer 720 (arrow 786) toward the reflective polarizer 720. Back scattered light that has a polarization aligned with the pass axis of the reflective polarizer 710 may pass through the reflective polarizer 710 (arrow 784). Back scattered light that has a polarization that is not aligned with the pass axis of the reflective polarizer 710 is reflected by the reflective polarizer 710 (arrow 780). Some of this reflected, polarized light 780 passes through the nanowire layer 720 without being scattered as excess haze component 789. Some of the back scattered and then reflected light 780 is forward scattered by the nanowire layer 720 as excess haze component 788.

With the benefit of the above understanding of the origin of haze amplification, and with the objective of reducing the haze of a light scattering layer and polarizer combination, new designs were developed as discussed in embodiments provided herein. As shown in the illustrated embodiments, the new design embodiments involve interposing a metal nanowire-based transparent conductor layer (or other electrically conductive light scattering medium) between pass-axis-aligned reflective and absorptive polarizers to obtain polarization selective light recycling.

Figure 9A:
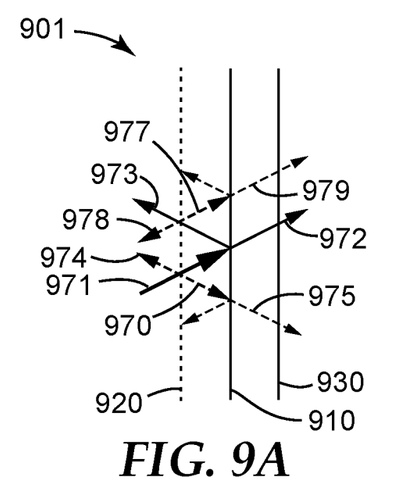
FIG. 9A schematically illustrates operation of a comparative optical construction that includes a transparent, conductive nanowire layer, reflective polarizer layer, and absorptive polarizer layer arranged in that order from a light source.
Figure 9B:
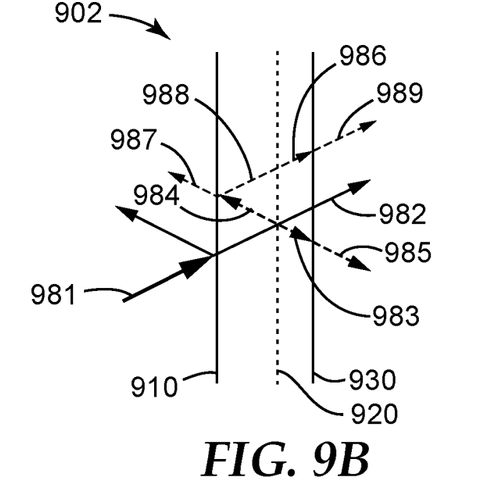
FIG. 9B schematically illustrates operation of an optical construction in accordance with embodiments discussed herein which provides a mechanism for excess haze reduction.

FIG. 9A schematically illustrates operation of a comparative optical construction 901 that includes a transparent, conductive nanowire layer, reflective polarizer layer, and absorptive polarizer layer arranged in that order from the light source. Comparative construction 901 results in a relatively high haze. FIG. 9B schematically illustrates operation of an optical construction 902 in accordance with embodiments discussed herein which provides a mechanism for excess haze reduction. In optical construction 902, a transparent, electrically conductive nanowire layer 920 is disposed between a reflective polarizer layer 910 and an absorptive polarizer layer 930 with input light from a source incident on the reflective polarizer layer 910. In constructions 901 and 902, the pass axis of the reflective polarizer is parallel to the pass axis of the absorptive polarizer.

FIG. 9A illustrates a construction 901 wherein input light (represented by arrow 971) is incident on the nanowire layer 920. Light that emerges from the optical construction 901 has three components labeled in FIG. 9A as specular transmission (arrow 972), primary nanowire (NW) haze (arrow 975), and excess haze (arrow 979).

A portion of the input light is not scattered by the nanowire layer 920 and passes through the nanowire layer 920 to the reflective polarizer 910. Unscattered light that passes through the nanowire layer 920 and that also has a polarization that aligns with the pass axis of the reflective polarizer 910 and the pass axis of the absorptive polarizer 930 passes through the reflective polarizer 920 and the absorptive polarizer 930 providing the specular transmission component 972.

Some input light is scattered by the nanowire layer 920 resulting in back scattered light 974 and forward scattered light 970. A portion of forward scattered light 970 having a polarization that aligns with the pass axis of the reflective polarizer 910 and the pass axis of the absorptive polarizer 930 passes through the reflective and absorptive polarizer layers 910, 930. The forward scattered, polarized light provides the primary nanowire haze 975.

Light 973 that is not scattered by the nanowire layer 920 and that has a polarization that does not align with the pass axis of the reflective polarizer 910 is reflected by the reflective polarizer 910 toward the nanowire layer 920. When this reflected light 973 interacts with the nanowire layer 920, some light is forward scattered 978 (forward relative to light 973) and some light is back scattered 977 (back relative to light 973) by the nanowire layer 920. Light 977 that is back scattered by the nanowire layer 920 and that also has a pass axis aligned with the pass axes of the reflective polarizer 910 and the absorptive polarizer 930 passes through the reflective and absorptive polarizers 910, 930. This reflected, back scattered, and polarized light 979 provides at least some of the excess haze of the optical construction 901. In the comparative optical construction 901, light that passes through the reflective polarizer 910 will also be passed by the absorptive polarizer due to alignment of the pass axes of the reflective and absorptive polarizers. The output light components 979, 972, 975 are polarized to the pass axis of the absorptive polarizer 930 resulting in relatively high haze.

FIG. 9B schematically depicts operation of optical construction 902 having a nanowire layer 920 disposed between a reflective polarizer 910 and an absorptive polarizer 930 wherein input light 981 is incident on the reflective polarizer 910. The light that emerges from the optical construction 902 has three components labeled in FIG. 9B as specular transmission 982, primary nanowire (NW) haze 985, and excess haze 989.

Input light having a polarization that aligns with the pass axis of the reflective polarizer 910 passes through the reflective polarizer 910 to the nanowire layer 920. The light scattering nanowire layer 920 scatters and depolarizes some light that emerges from the reflective polarizer 910. Some light 983 that passes through the reflective polarizer 910 is forward scattered toward the absorptive polarizer. The forward scattered light that has a polarization that aligns with the pass axis of the absorptive polarizer passes through the absorptive polarizer as primary NW haze 985. Light that is back scattered from the nanowire layer (arrow 984) and that has a polarization that aligns with the pass axis of the reflective polarizer exits the construction 902 (arrow 987). Only the light that has a polarization orthogonal to the pass axis of the reflective polarizer is reflected by the reflective polarizer 910 toward the nanowire layer 920 (arrow 988). When the light 988 encounters the nanowire layer 920, a major portion of light 988 passes through the nanowire layer and remains polarized with polarization orthogonal to the pass axis of the reflective polarizer, and a minority portion forward scattered and depolarized (the majority portion and minority portion are both depicted as arrow 986). Of the light 986 emerging from the nanowire layer 920, only the component that has a polarization aligned with the pass axis of the absorptive polarizer (a portion of the minority component of light 986) passes through the absorptive polarizer as excess haze 989, and the remaining (majority component) of light 986 is absorbed (thereby reducing the excess haze). In construction 902, only the specular transmission 982 component fully passes through the absorptive polarizer. The primary haze is reduced at least in part because the nanowire layer 920 interposed between the reflective polarizer 910 and the absorptive polarizer 930 depolarizes forward scattered light that emerges from the reflective polarizer 910. Excess haze is largely attenuated because light that is backscattered from the nanowire layer having a polarization that aligns with the pass axis of the absorptive polarizer exits backward through the reflective polarizer and does not contribute to haze. Light that is forward scattered by the nanowire layer and that has a polarization that differs from the pass axis of the absorptive polarizer is attenuated by absorptive polarizer resulting in reduced primary and excess haze.

EXAMPLES

Film assemblies (optical constructions) were prepared by stacking individual films. The film assemblies were measured for their transmitted haze (Suga Haze Meter HZ-V3, Suga Test Instruments, Tokyo, Japan). The results of Comparative Examples 1-3 and Example 4 are recorded in Table 1. The results of Comparative Examples 5-7 and Example 8 are recorded in Table 2. These results confirm that an optical construction that includes a nanowire layer disposed between a reflective polarizer and an absorptive polarizer exhibits reduced haze when compared to comparative optical constructions comprising a nanowire layer and reflective polarizer (without an absorptive polarizer) and exhibit reduced haze when compared to comparative optical constructions that include a nanowire layer, reflective, and absorptive polarizers wherein reflective polarizer is between the nanowire layer and the absorptive polarizer.

Film 1 (reflective polarizer with silver nanowire layer coating): 3M Advanced Polarizer Film (3M Company, St. Paul, Minn.), coated with silver nanowires (commercially obtained from Cambrios Technologies Corporation, Sunnyvale, Calif. under the designation ClearOhm® Ink W G4-01) on Side A. Film 1 includes a reflective polarizer layer and a metal nanowire based transparent conductor layer. The sheet resistance of the silver nanowire layer measured approximately 50 ohms per square.

Film 2 (reflective polarizer with silver nanowire layer coating): 3M Advanced Polarizer Film (3M Company, St. Paul, Minn.), coated with silver nanowires (commercially obtained from Cambrios Technologies Corporation, Sunnyvale, Calif. under the designation ClearOhm® Ink-A AQ) on Side A. Film 2 includes a reflective polarizer layer and a metal nanowire based transparent conductor layer. The sheet resistance of the silver nanowire layer measured approximately 40 ohms per square.

Film 3 (absorptive polarizer): Sanritz absorptive polarizer film (Sanritz HLC2-56-18S, Sanritz America, Chula Vista, Calif.). Film 3 includes an absorptive polarizer layer.

Comparative Example 1

Figure 10:
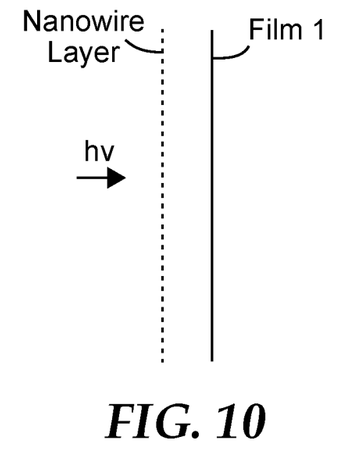
FIG. 10 shows the arrangement of Film 1 relative to the input light hv for comparative example 1.

Film 1 was measured for light transmission and haze using the Suga Haze Meter, with Side A (nanowire-coated side) facing the light source. FIG. 10 shows the arrangement of Film 1 relative to the input light hv.

Comparative Example 2

Figure 11:
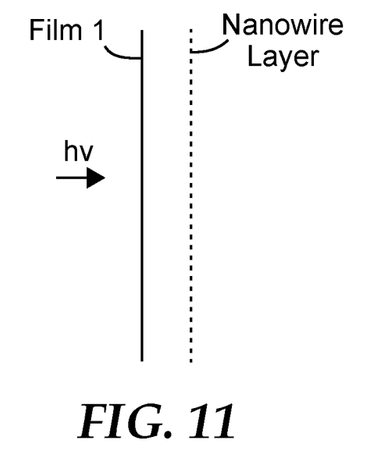
FIG. 11 shows the arrangement of Film 1 relative to the input light hv for comparative example 2.

Film 1 was measured for light transmission and haze using the Suga Haze Meter, with Side A (nanowire-coated side) facing away from the light source (i.e., toward the instrument detector). FIG. 11 shows the arrangement of Film 1 relative to the input light hv.

Comparative Example 3

Figure 12:
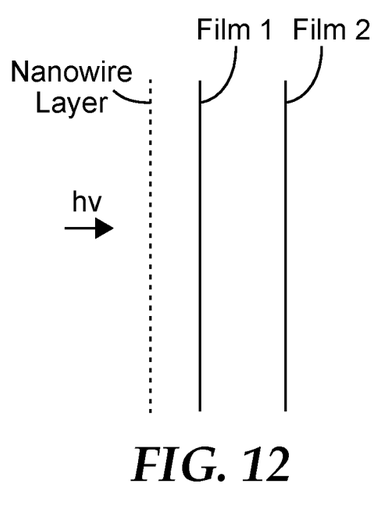
FIG. 12 shows the arrangement of Film 1 and Film 2 relative to the input light hv for comparative example 3.

A film assembly comprising stacked Film 1 and Film 2 was measured for light transmission and haze using the Suga Haze Meter, with Film 1 toward the light source (relative to Film 2) and Side A of Film 1 facing the light source. FIG. 12 shows the arrangement of Film 1 and Film 2 relative to the input light hv.

Example 4

Figure 13:
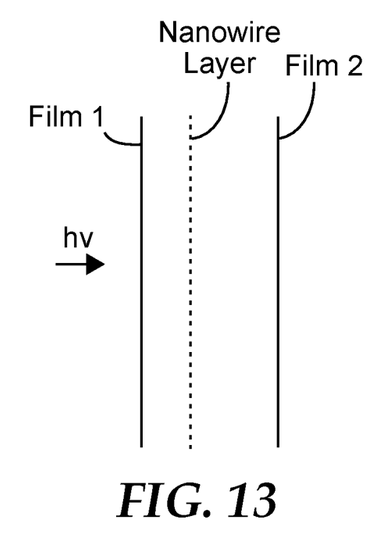
FIG. 13 shows the arrangement of Film 1 and Film 2 relative to the input light hv for example 4.

A film assembly comprising stacked Film 1 and Film 2 was measured for light transmission and haze using the Suga Haze Meter, with Film 1 toward the light source (relative to Film 2) and Side A of Film 1 facing away from the light source (i.e., toward Film 2). FIG. 13 shows the arrangement of Film 1 and Film 2 relative to the input light hv.

TABLE 1

| Results | | |
|---|---|---|
| Example | % Transmission | % Haze |
| Comparative Example 1 | 47.59 | 3.03 |
| Comparative Example 2 | 47.57 | 3.06 |
| Comparative Example 3 | 38.44 | 3.03 |
| Example 4 | 37.86 | 1.67 |

Comparative Example 5

Film 2 was measured for light transmission and haze using the Suga Haze Meter, with Side A (nanowire-coated side) facing the light source.

Comparative Example 6

Film 2 was measured for light transmission and haze using the Suga Haze Meter, with Side A (nanowire-coated side) facing away from the light source (i.e., toward the instrument detector).

Comparative Example 7

A film assembly comprising stacked Film 2 and Film 3 was measured for light transmission and haze using the Suga Haze Meter, with Film 2 toward the light source (relative to Film 3) and Side A of Film 2 facing the light source.

Example 8

A film assembly comprising stacked Film 2 and Film 3 was measured for light transmission and haze using the Suga Haze Meter, with Film 2 toward the light source (relative to Film 2) and Side A of Film 2 facing away from the light source (i.e., toward Film 3).

TABLE 2

| Results | | |
|---|---|---|
| Example | % Transmission | % Haze |
| Comparative Example 5 | 46.01 | 1.59 |
| Comparative Example 6 | 45.96 | 1.54 |
| Comparative Example 7 | 37.09 | 1.78 |
| Example 8 | 36.52 | 1.00 |

Items discussed herein include:

Item 1. An optical construction comprising:
   a reflective polarizer layer having a first pass axis;
   an absorptive polarizer layer having a second pass axis that is substantially aligned with the first pass axis; and
   at least one electrically conductive light scattering layer between the reflective polarizer layer and the absorptive polarizer layer.

Item 2. The optical construction of item 1, wherein the light scattering layer comprises metal nanowires.

Item 3. The optical construction of item 2, wherein the metal nanowires are embedded in a non-porous polymer matrix.

Item 4. The optical construction of item 2, wherein the metal nanowires have an aspect ratio of greater than about 5.

Item 5. The optical construction of any of items 1 through 4, wherein the light scattering layer comprises carbon nanotubes.

Item 6. The optical construction of any of items 1 through 4, wherein the light scattering layer comprises a patterned thin film metal mesh.

Item 7. The optical construction of any of items 1 through 6, wherein the light scattering layer has a sheet resistance of between about 0.01 and $10^9$ ohms per square.

Item 8. The optical construction of any of items 1 through 7, wherein the light scattering layer has a transmitted haze between about 0.2 and 5 percent.

Item 9. The optical construction of any of items 1 through 8, wherein the optical construction has a transmitted haze between about 0.1 and 10 percent.

Item 10. The optical construction of any of items 1 through 9, wherein the optical construction has a transmitted haze that is less than a transmitted haze of a combination of the light scattering layer and the reflective polarizer layer.

Item 11. The optical construction of any of items 1 through 10, wherein the light scattering layer has a thickness of between about 1 nanometer and 1 micrometer.

Item 12. The optical construction of any of items 1 through 11, wherein the light-scattering layer has a refractive index of greater than about 1.40 and less than about 2.20.

Item 13. The optical construction of any of items 1 through 12, wherein the reflective polarizer comprises a multilayer optical film.

Item 14. The optical construction of any of items 1 through 13, wherein the light scattering layer is disposed on a supporting substrate.

Item 15. The optical construction of item 14, wherein the supporting substrate is a polymer film.

Item 16. The optical construction of any of items 1 through 15, wherein the light scattering layer is coated on at least one of the reflective polarizer layer and the absorptive polarizer layer.

Item 17. The optical construction of any of items 1 through 16, wherein an optically clear adhesive layer is arranged between the reflective polarizer layer and the light scattering layer.

Item 18. The optical construction of any of items 1 through 17, wherein an optically clear adhesive layer is arranged between the absorptive polarizer layer and the light scattering layer.

Item 19. The optical construction of any of claims 1 through 18, wherein:
   the reflective polarizer layer has a first major surface and a second major surface facing the light scattering layer; and
   further comprising a light source configured to provide the input light to the first major surface.

Item 20. The optical construction of item 19, wherein:
   the absorptive polarizer layer has a first major surface and a second major surface facing the light scattering layer; and
   further comprising a display module adjacent to the first major surface of the absorptive polarizer layer.

Item 21. The optical construction of item 20, further comprising one or more electrical connections to the light scattering layer.

Item 22. The optical construction of item 21, wherein the one or more electrical connections are configured to electrically couple the light scattering layer for operation as one or both of a touch sensor and a force sensor.

Item 23. The optical construction of item 21, wherein the one or more electrical connections are configured to electrically couple the light scattering layer as an electromagnetic interference shield.

Item 24. The optical construction of item 21, wherein the one or more electrical connections are configured to electrically couple the light scattering layer as an electrostatic discharge dissipation layer.

Item 25. The optical construction of item 21, wherein the one or more electrical connections are configured to electrically couple the light scattering layer as a control contact layer for display element switching.

Item 26. The optical construction of item 21, wherein the one or more electrical connections are configure to couple the light scattering layer through a low impedance path to ground.

Item 27. The optical construction of any of items 1 through 26, wherein the light scattering layer comprises a substantially continuous, non-voided layer.

Item 28. An optical construction comprising:
  a partially reflective layer configured to receive input light;
  an absorptive polarizer layer; and
  an electrically conductive light scattering layer between the partially reflective layer and the absorptive polarizer layer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical construction comprising:
    a partial reflector having visible light reflectance between about 25% to about 75%;
    an absorptive polarizer disposed on the partial reflector; and
    a metal mesh disposed between the partial reflector and the absorptive polarizer, wherein the metal mesh is configured to operate as a touch sensor.

2. The optical construction of claim 1, wherein the partial reflector comprises a reflective polarizer, wherein pass axes of the absorptive polarizer and the reflective polarizer are within about 15 degrees of each other.

3. The optical construction of claim 2, wherein the reflective polarizer comprises a multilayer optical film.

4. The optical construction of claim 1, wherein the metal mesh comprises a square mesh.

5. The optical construction of claim 1, wherein the metal mesh comprises a hexagonal mesh.

6. The optical construction of claim 1, wherein the metal mesh comprises a random mesh.

7. The optical construction of claim 1, wherein the metal mesh comprises metal traces having a width between about 0.05 microns to about 10 microns.

8. The optical construction of claim 1, wherein the metal mesh comprises metal traces having a thickness between about 0.05 microns to about 10 microns.

9. The optical construction of claim 1, wherein the metal mesh comprises one or more of silver, aluminum, gold and palladium.

10. The optical construction of claim 1 further comprising one or more electrical connections to the metal mesh.

11. The optical construction of claim 1, wherein the metal mesh has a sheet resistance between about 0.01 and $10^9$ ohms per square.

12. The optical construction of claim 1, wherein the metal mesh has a transmitted haze between about 0.2 and 5 percent.

13. A display system comprising a display disposed on the optical construction of claim 1.

14. The display system of claim 13, wherein the display comprises a liquid crystal display.

15. An optical construction comprising:
    a partial reflector having visible light reflectance between about 25% to about 75%;
    an absorptive polarizer disposed on the partial reflector; and
    a metal mesh disposed between the partial reflector and the absorptive polarizer and having a transmitted haze between about 0.1 and 10 percent.

16. A display system comprising a display disposed on the optical construction of claim 15.

17. The display system of claim 16, wherein the display comprises a liquid crystal display.

18. The optical construction of claim 15, wherein the transmitted haze is between about 0.2 and 5 percent.

19. The optical construction of claim 15, wherein the transmitted haze is between about 0.3 and 3 percent.

* * * * *